(12) United States Patent
Futselaar et al.

(10) Patent No.: US 7,611,634 B2
(45) Date of Patent: Nov. 3, 2009

(54) METHOD FOR MONITORING THE DEGREE OF FOULING OF A FILTER

(75) Inventors: Harry Futselaar, Hengelo (NL); Bastiaan Blankert, Enschede (NL); Bernardus Henricus Louis Betlem, Enschede (NL); Matthias Wessling, Enschede (NL)

(73) Assignee: NORIT Membraan Technologie B.V., Enschede (NL)

( * ) Notice: Subject to any disclaimer, the term of this patent is extended or adjusted under 35 U.S.C. 154(b) by 76 days.

(21) Appl. No.: 11/686,513

(22) Filed: Mar. 15, 2007

(65) Prior Publication Data
US 2007/0241058 A1  Oct. 18, 2007

Related U.S. Application Data

(63) Continuation-in-part of application No. PCT/NL2005/000631, filed on Sep. 1, 2005.

(30) Foreign Application Priority Data

Sep. 16, 2004  (NL) .................................. 1027050

(51) Int. Cl.
  C02F 1/52  (2006.01)
  B01D 24/46  (2006.01)
  G01M 3/02  (2006.01)
(52) U.S. Cl. ...................... 210/741; 210/739; 210/791; 73/37
(58) Field of Classification Search ................ 210/741, 210/739, 791; 73/37
  See application file for complete search history.

(56) References Cited

U.S. PATENT DOCUMENTS

| 4,692,253 | A | | 9/1987 | Otake et al. |
| 5,484,536 | A | | 1/1996 | Yamaguchi et al. |
| 5,647,988 | A | * | 7/1997 | Kawanishi et al. ........... 210/636 |
| 6,077,435 | A | * | 6/2000 | Beck et al. ................... 210/636 |
| 6,645,277 | B1 | | 11/2003 | Franz et al. |
| 2005/0258098 | A1 | * | 11/2005 | Vincent et al. .............. 210/636 |

FOREIGN PATENT DOCUMENTS

| DE | 19607740 | 9/1997 |
| WO | WO 01/30483 | 5/2001 |

* cited by examiner

Primary Examiner—Duane Smith
Assistant Examiner—Paul J Durand
(74) Attorney, Agent, or Firm—Jeffrey D. Myers; Samantha A. Updegraff; Peacock Myers, P.C.

(57) ABSTRACT

A method of filtering a fluid wherein after filtering a contaminated fluid, which causes the formation of a filter cake, a substantially non-contaminated fluid is fed through the filter cake and filter at varying flux or at varying driving force. At the same time the necessary driving force or the obtained flux, respectively, are measured. The measured value and the respective value setting are compared with at least one standard set of data and on the basis of this comparison the fouling status of the fluid to be filtered, the filter and the filter cake is determined. The method makes it possible to accurately determine characteristics of a fluid to be filtered. This may be realized by simply varying the flux and measuring the driving force at different flux values, or vice versa.

17 Claims, 4 Drawing Sheets

METHOD FOR MONITORING THE DEGREE OF FOULING OF A FILTER

CROSS-REFERENCE TO RELATED APPLICATIONS

This application is a continuation-in-part application of Patent Cooperation Treaty (PCT) Patent Application Serial No. PCT/NL2005/000631, entitled "METHOD FOR MONITORING THE DEGREE OF FOULING OF A FILTER", to NORIT Membraan Technologie B.V., filed on Sep. 1, 2005, and the specification and claims thereof are incorporated herein by reference.

This application claims priority to and the benefit of the filing of Netherlands Patent Application Serial No. 1027050, entitled "CLEAN WATER CHARACTERIZATION", filed on Sep. 16, 2004, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention

The present invention relates to a method of filtering a fluid, in particular to a method of obtaining a status characteristic and a change therein of a fluid to be filtered and a filter medium, more specifically to a method of characterizing a fouling status and a change therein of a fluid to be filtered and a filter medium. The invention relates in particular to a method by which a status characteristic and a change therein can be obtained from a filter medium and the fluid to be filtered. Unless explicitly stated otherwise, the term filter medium in the context of the invention refers to the (clean) filter as well as the filter cake formed on the filter and the combination of the two.

Hereinafter only specific elements of the filtration processes, especially the characteristics of a filter cake and a fluid to be filtered, as well as changes of the characteristics will be referred to. However, the invention is in no way limited to these merely exemplary embodiments.

BRIEF SUMMARY OF THE INVENTION

1. Field of the Invention

Filtering fluids to remove contaminants is generally known in the art. When filtering a fluid in order to remove contaminants, a filter will be used on which part of the contaminants is deposited in the form of a filter cake. Depending on the nature of the material that is filtered off, this filter cake may vary greatly, for example, it may be a compressible, a non-compressible or a compactable filter cake. Also, the material filtered off may clog the pores of the filter to a greater or lesser degree or may, for example, be adsorbed to the filter material.

When the filter cake has reached a certain thickness, the filter cake will generally have to be removed. The manner of filtration and of removal of the filter cake depends, among other things, on the type of filter medium, which includes the nature of the filter cake. It is therefore advisable to know the nature of the filter medium's fouling status and the nature of the filter cake, the fouling status of the filter and the fouling characteristics of the fluid to be filtered, with the object of, based on such momentary status and associated, time-dependent changes in such status, becoming able to control, model and optimize important aspects of the filtration process, such as:

the producing part the hydraulic/mechanical purification part (for example, the backwash); and the chemical purification part.

Both the material and the shape of the filter have an effect on the status characteristic of the filter medium to be obtained during a filtration process. This applies especially to the geometry, for example the diameter of the filter, with a view to avoiding clogging and to the composition of the material, with a view to avoiding adsorption.

2. Description of Related Art

In the prior art, a filter is generally cleaned according to a standard procedure. When a filter cake has reached a particular thickness, or when the driving force exceeds a certain value, or after a pre-set time interval, the filter cake can be removed by means of, for example, back-washing or surface washing, possibly in combination with chemicals, with the same fluid to be filtered, the filtered fluid and/or combinations of these and other fluids (for example, a gas) or a solid. However, the status of the filter medium, in particular the nature of the filter cake is not taken into account here.

DETAILED DESCRIPTION OF THE INVENTION

There exists therefore a need of a method with which—the status and the change therein of the filter medium, that is to say the status of the filter and the filter cake can be determined in a simple manner. There is in particular need of such a method in combination with a cleaning process of the filter, with the object of, based on such momentary status and associated, time-dependent changes in such status, becoming able to control, model and optimize important aspects of the filtration process, as mentioned above.

It is the object of the invention to provide an improved method of obtaining a status characteristic and a change therein of a filtration process (this refers to characteristics of the filter medium as well as the fluid to be filtered and the contaminants contained therein) in a simple manner. An object of the invention is in particular to provide a method which allows a fouling status (and a change therein) of the fouling of a filtration process to be characterized.

Another object of the invention is to provide a method, which allows the fouling status of a filtration process to be characterized, and allows the amount of fouling to be derived. The object of the invention is in general to provide an improved method of the kind mentioned in the preamble with the aim of arriving at the above-mentioned possibilities relating to controlling, modeling and optimizing the filtration process. The acquired data are also intended for obtaining design data and process data, on the basis of which it is possible to arrive at:

how to adapt the characteristics of the fluid by, for example, physical or chemical treatment steps (such as heating/cooling, dilution, flocculation, pre-filtration, etc.);

the choice of the appropriate geometry and composition of the filter medium (for example, the diameter of the filter to prevent clogging, and the choice of material to, for example, avoid adsorption);

the choice of the appropriate hydraulic/mechanical cleaning methods;

the choice of the appropriate chemical cleaning methods;

the ability to estimate the capacity of the filtration process (because the measure of irreversibility of the fouling status becomes known or can be determined from the data to be obtained);

how to obtain data concerning the separating quality of the filtration process (because the ageing process of the filter medium is known or can be calculated, and hence the life span of the filter medium). Moreover, in this way information becomes available for the design and the operation of a filtration installation.

In order to obtain at least one of the above-mentioned objectives, the invention provides a method as mentioned above, which is characterized in that it comprises the steps of:

a) filtering a contaminated fluid in order to remove from said fluid contaminants, which are deposited on a filter in the form of a filter cake, b) subsequently feeding through the filter medium a substantially non-fouling fluid at:

I. a varying flux, and measuring the driving force, or

II. a varying driving force, and measuring the flux, c) comparing: I. the measured values of the driving force with the respective flux, or II. the measured value of the flux with the respective driving force, using at least one standard set of data, and d) on the basis of the comparison in step c) characterizing a status characteristic or a change therein of the filtration process (for example, the fluid to be filtered or the filter medium), wherein during successive periods of time the steps a) to d) are repeated, and the values obtained in step d) during successive periods of time are compared with each other in step d) in order to obtain a change in the status characteristic.

Using the method according to the invention, it is very simple to obtain a status characteristic of a filtration process. In particular, it makes it possible to obtain a fouling characteristic and a change therein of the filtration process. Since the fluid that is fed through the filter cake and the filter is substantially not contaminated, there will be no further change in the filter cake during characterization.

The method according to the invention also makes it possible to determine the amount and the nature of the deposited material. An advantage is obtained with respect to the known methods for determining the amount of the deposited material. For, according to other methods, it is necessary either to provide extra measuring equipment or to make physical changes to the filter cake in order to measure its progression of thickness. By measuring the driving force over, and the flux through the filter, the invention makes it possible to determine the filter cake's average thickness and progression thereof.

The advantage of the present invention cannot be obtained with methods of the prior art. To monitor the development of the driving force during the filtration procedure and, based on the measured values of the driving force, to initiate a cleaning step, is already known in the prior art. However, measuring only the driving force does not provide any knowledge concerning the nature of the fouling. In that respect therefore, the invention provides a considerable improvement and advantage. It is now known how, based on the characteristics of the fluid, the nature of the fouling and the condition of the filter medium, to carry out a purposeful cleaning step.

The terms "non-contaminated fluid" or "non-contaminating fluid" interchangeably used in the present description mean that during the procedure of characterizing the status of the filtration process, substantially no contamination takes place. This means that the variation in the flux has to be much faster than the build up of the fouling, in which case the characterization itself could take place with the same feed as the one being purified in the filtration.

According to a preferred embodiment of the invention, good results are obtained when during step b) the substantially non-contaminated fluid is fed through the filter medium in the direction of filtration.

According to a preferred embodiment of the invention, further particularly good results are obtained when during step b) the substantially non-contaminated fluid is fed through the filter cake counter to the direction of filtration.

It is in any case preferred that the further increase of fouling of the filter during the characterization be maximally 10% of the fouling already present, preferably maximally 5%, more preferably maximally 2%, still more preferably maximally 1% and most preferably maximally 0.5%. In accordance with a preferred embodiment, this further increase of fouling is expressed in the driving force, which is measured at a predetermined flux.

According to a further preferred embodiment of the invention, the standard set comprises at least one set selected from: substantially constant flux values at varying driving force values; substantially constant driving force values at varying flux values; and increasing or decreasing driving force values at increasing or decreasing, respectively, flux values and wherein each of these sets represents a fouling characteristic. Such sets provide a satisfactory description of possible types of fouling conditions.

According to another embodiment, the standard set is formed by a set of parameters of a model describing the relation between the driving force and the flux. Comparison of the measured value with a standard set of measuring values at a certain flux value also provides a useful indication of the characteristics of the fluid, the nature of the fouling, and the status of the filter medium.

The characterization is preferably selected from at least one of compressible filter cake and non-compressible filter cake. Based on this characterization, an appropriate method with respect to controlling, modeling and optimizing the filtration process can be chosen.

According to a suitable further development of the invention, after the completion of step d) in accordance with the invention, e) the filter is subjected to a cleaning treatment in order to substantially remove the filter cake, f) whereafter the steps b) and c) are carried out in order to characterize the modified status after the cleaning treatment. If the cleaning treatment is shown to have been inadequate, steps e) to f) may be repeated. In this way it is possible to determine whether the filter device can be cleaned adequately or how the filter device could be cleaned adequately (namely by comparison with a standard set of data).

According to a further preferred embodiment, the standard set of data is obtained from characterizing a non-contaminated filter, for example, a new filter with non-contaminated fluid. The fluid used for the characterization is preferably the same as the fluid used for determining the standard data.

The invention therefore also relates to a method of obtaining a standard set of measuring data of a new filter, suitable to be used in a method according to one of the preceding embodiments, which comprises feeding substantially non-contaminated fluid through an unfouled filter at:

I. a varying flux wherein the driving force is measured, or

II. a varying driving force wherein the flux is measured, and storing the values of the driving force and the respective flux in a standard set of data.

Although the invention is not limited to a particular type of filtration mode, it is preferred that the filtration steps occur in dead-end mode. This allows a precise determination of the relation between the driving force and flux. However, a person skilled in the art of filtration will be acquainted with the fact that under well-defined conditions such a process can also be carried out in cross-flow mode or in a combination of the two, a so-called semi-dead-end mode.

During the application of this method, it is preferred for other (physical) characteristics of the medium to be determined such as, for example, the temperature for determining the viscosity, the turbidity, the particle size distribution, the concentration, the conductivity and the like. The specific other characteristics to be measured depend on the model used for the filtration process, wherein the resistance is also explicitly specified (such as Darcy's law relating to so-called cake layer filtration). The effect of contamination on the resistance can be deduced by also comparing with the resistance of a clean filter with a non-contaminated fluid. Based on that, it is possible to calculate the amount of contamination.

When, for example, different flux values are set for substantially non-contaminated fluid passing through the fouled filter medium (i.e. the filter and the filter cake), a graph is provided in accordance with the invention, showing the relationship between the driving force and the flux. The nature of the fouling can be determined from the curve of this graph. This will later be described in more detail.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

In a sense, there is a substantial similarity between the filtration curves. Based on this one cannot determine the characteristics of the fluid and of the filter medium. It is therefore not possible to arrive at a correct description, control, modeling and optimization of the total filtration process on this basis.

Figure 3:
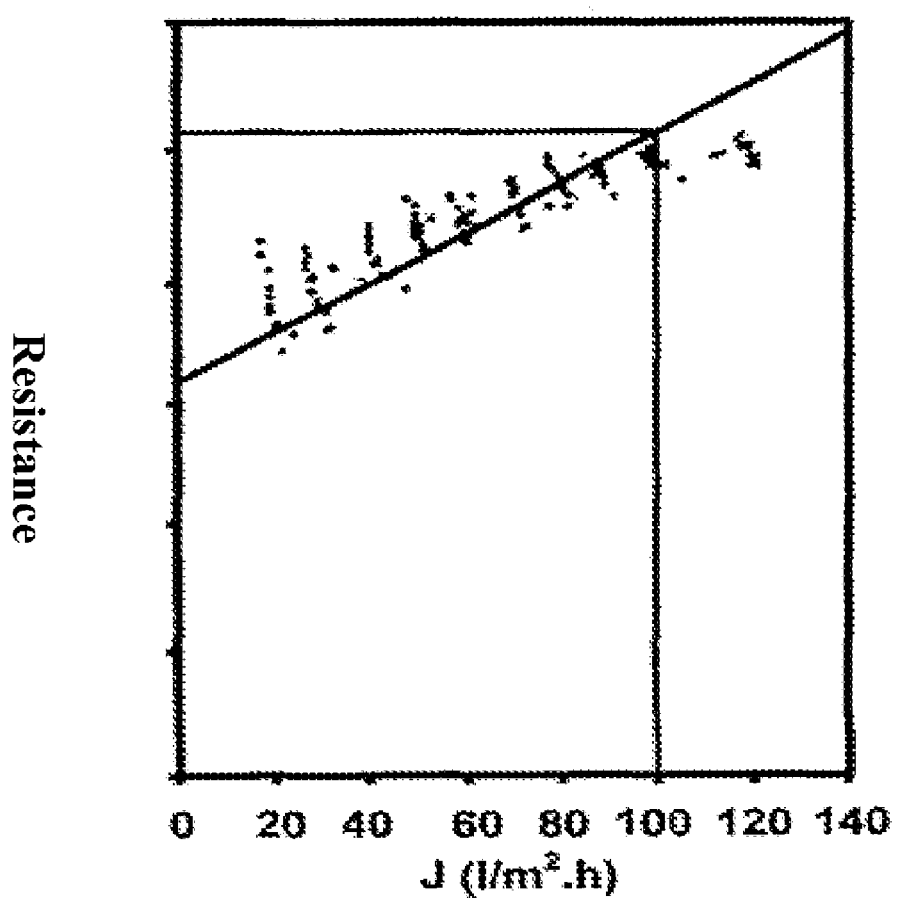
Figure 4:
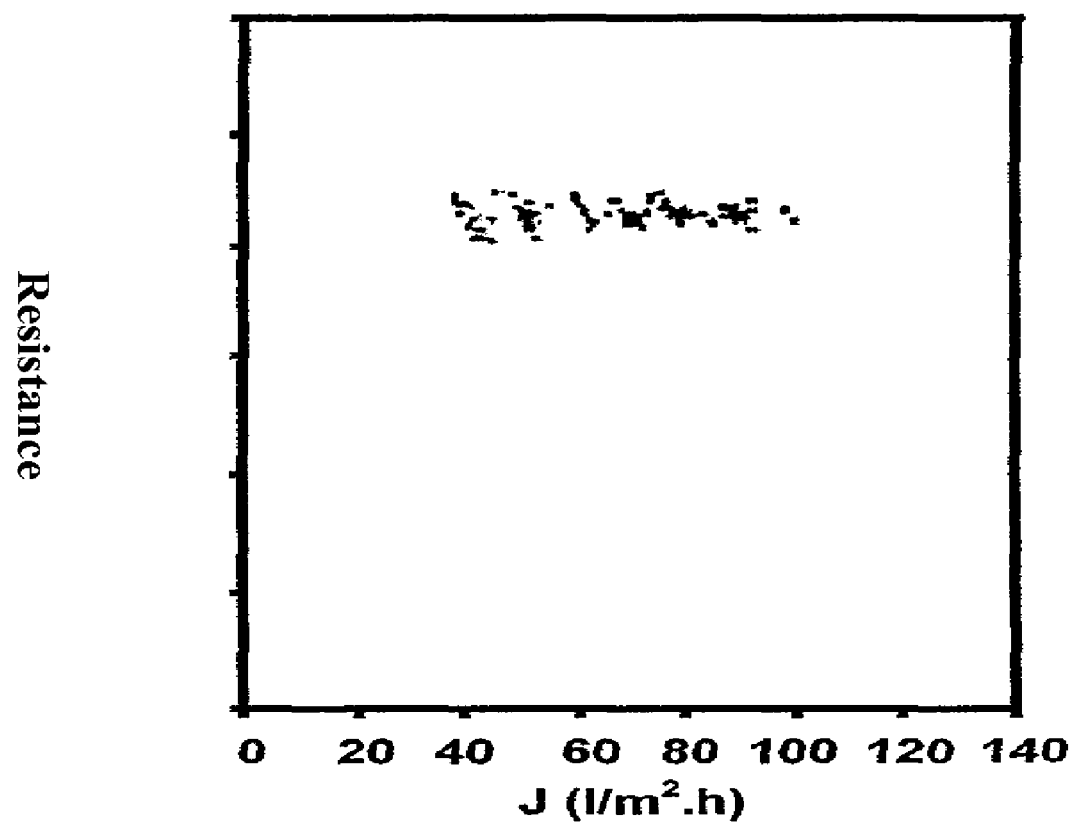

When a characterization of the filtration process is carried out in accordance with the invention, the graphs, as shown in the FIGS. 3 and 4 respectively, are obtained. FIG. 3 shows the progression of the resistance through the filter cake when clean fluid is fed through at different fluxes. It can be clearly seen that the resistance increases with an increase in flux value.

In contrast to FIG. 3, FIG. 4 shows that the resistance does not increase with an increasing flux.

Figure 2:
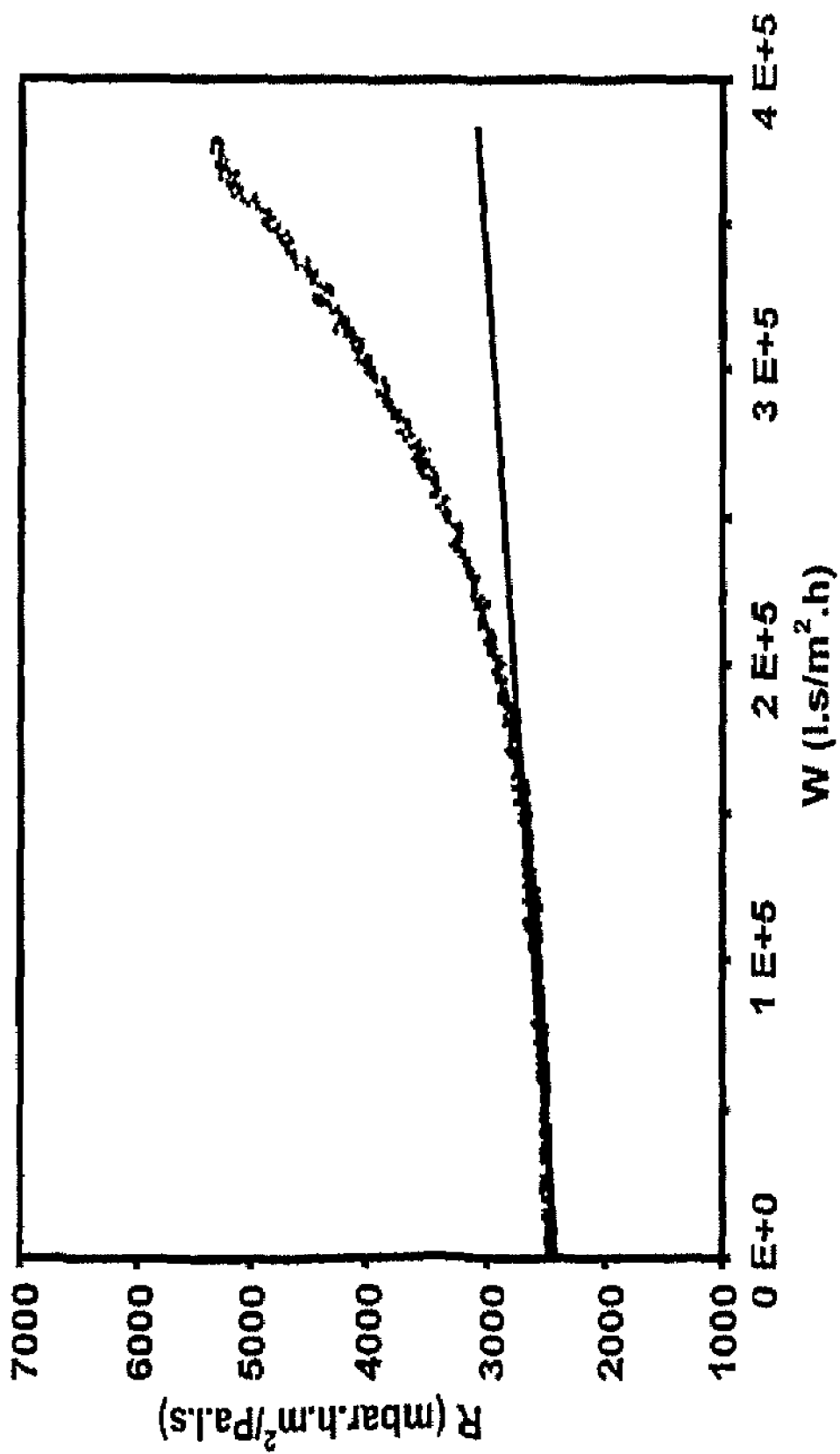
FIG. 2 shows the filtration curve of industrial backwash water. In this case also, the filtration curve seems to be representable by a second order polynomial.

FIGS. 3 and 4 therefore show that the behavior of the filter cake is completely different. Although FIG. 2 shows that the resistance strongly increases with an increase in cake formation, this is not caused by the compressibility or the flux-related behavior of the filter cake but by, for example, a volume effect.

Figure 1:
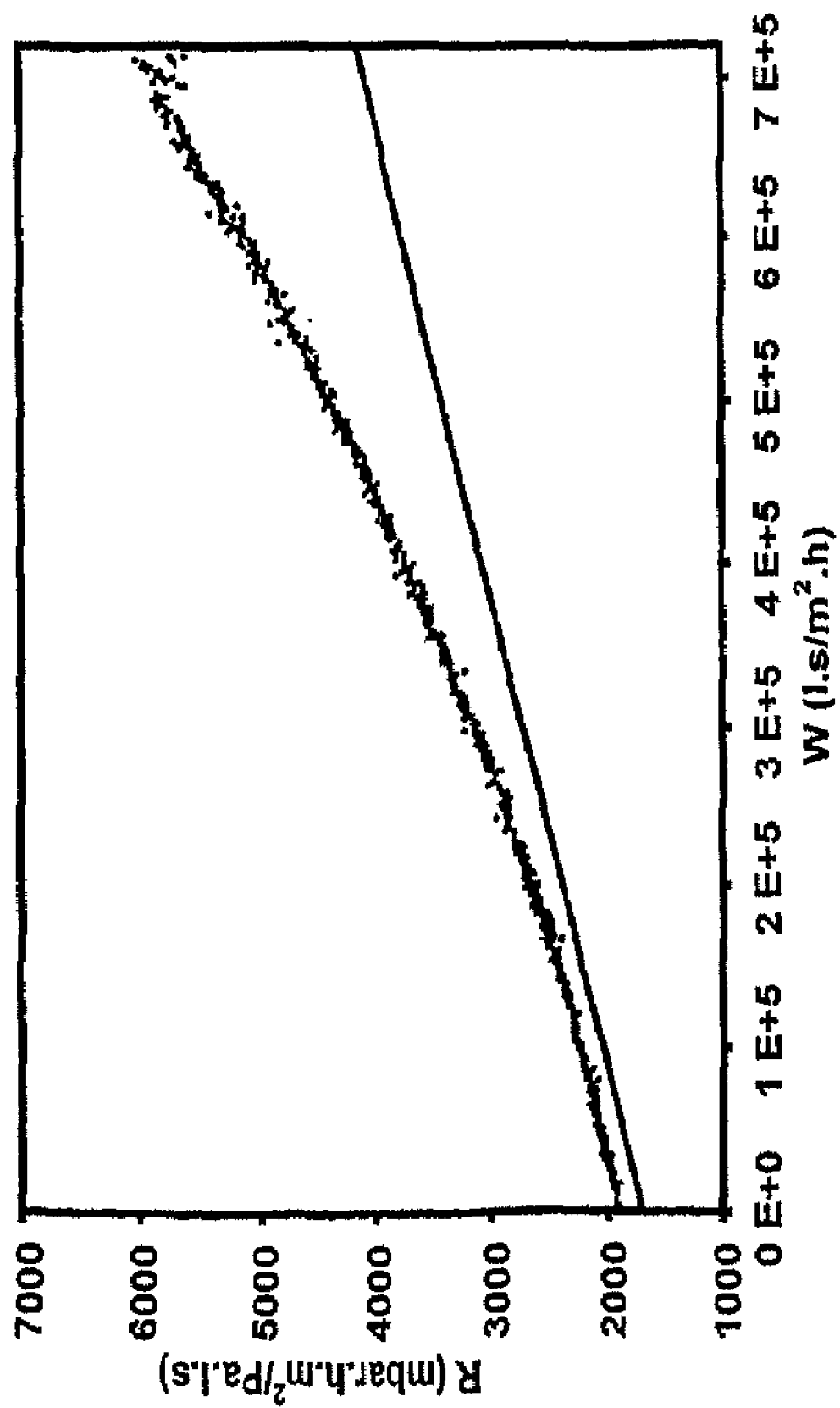
FIG. 1 shows a curve of a measured resistance through a filter cake, plotted against a variable that is proportional to a quantity of filtered material. In this case surface water was filtered. As can be seen from FIG. 1, such a filtration curve can be represented by a second order polynomial.

However, the filter cake resulting from the surface water behaves differently at a higher flux value. It may be concluded that in the present case the filter cake resulting from surface water and shown in FIG. 1, is compressed at a higher flux value. This increases the resistance.

In the case of the industrial wastewater on the other hand, the resistance does not increase when the flux is increased. In this case, the filter cake is not compressible. In this example the resistance may increase, for instance, because the flow passage becomes physically clogged up with material filtered out of the fluid.

The fluid that can be used to carry out the characterization may, for example, be clean liquid. If the liquid to be purified contains only few contaminants, only very little fouling will be added to the filter in the short period of time in which the characterization is carried out. In that case it may be acceptable to use the liquid to be purified as fluid for performing the characterization. Of course, it is also possible to dilute the liquid to be purified with clean liquid or to add auxiliary substances or additives that ensure that the filter cake is not fouled any further. Of course, it is equally possible to use already filtered fluid from the filtration step for the characterization.

In an industrial filtration installation, a very large number of filtration units will be arranged in parallel connection. One of these filtration units may, for example, be used for carrying out the characterization. In that case, that unit may be identical to the other filtration units, provided that it is made suitable for carrying out the characterization. For that purpose it must be possible to disconnect the respective filtration unit from the feed of fluid to be filtered. Instead of that, it must be possible during characterization to connect the respective filtration unit to an inlet of substantially clean fluid. This is of course not necessary if the characterization can also take place with the liquid to be filtered. In any case, however, facilities must be provided to allow either the flux or the driving force to be varied. In general it will therefore be necessary for the respective filtration unit to be hydraulically uncoupled from the other filtration units. A person skilled in the art is well able to implement such uncoupling, for example, by providing valves in appropriate places.

According to a further embodiment, it is possible to carry out the characterization in cross-flow instead of dead-end mode. Filtration can also take place in cross-flow, whereas, for example, characterization takes place in dead-end mode. Of course, all other combinations are also possible. However, an embodiment wherein at least the characterization takes place in dead-end mode, is preferred.

As. already mentioned, the resistance can be determined by measuring the driving force (for example the trans-filter pressure or trans-membrane pressure TMP). In the case of cake filtration, this takes place with the aid of Darcy's law:

$$R = TMP/\eta J \qquad (1)$$

Abbreviations:

R=total resistance;

TMP=driving force;

$\eta$=viscosity;

J=flux.

Finally, it is preferred to also measure the temperature of the fluid during step b). From the nature of the fluid and the temperature it is possible to accurately deter-mine the viscosity. According to Darcy's law it is then possible to calculate the resistance. If no fouling is present, this law can be used to determine the resistance of a clean filter. This is measured by filtering clean liquid (or another suitable fluid) through the clean filter at different flux values. At the active region the filter resistance can be approximated as follows:

$$R_M = R_{MO} + BJ \quad (2)$$

or:

$$R_M = R_{MO} + B'\eta J \quad (3)$$

Abbreviations:
RM=filter resistance;
RMO=flux-independent portion of the filter resistance;
B=proportionality constant;
B'=proportionality constant.

Once the filter resistance is known, a resistance in a serial approximation may be used to determine the resistance of the fouling.

$$R_F = TMP/\eta J - R_M \quad (4)$$

Abbreviations:
RF=current filter cake resistance.

The resistance from the fouling depends on the degree of fouling and possibly also on the flux. This has already been shown clearly in the above. The resistance is therefore represented as function of either the clean water flux or as function of the filtered volume per filter surface. According to a preferred embodiment, filtration occurs by means of dead-end filtration, and in that case this variable is directly related to a degree of fouling and is defined by:

$$\frac{d\omega}{dt} = J \quad (5)$$

Abbreviations:
ω=fouling load;
t=time.

For a compressible cake layer, the relation between cake layer resistance and pressure drop over the cake layer is shown by means of the following empirical relation:

$$R_F = \omega\alpha(1 + \beta\Delta P_F^n) \quad (6)$$

wherein:
ω=fouling load
α=specific cake layer resistance
β=compressibility factor
$\Delta P_F$=pressure drop over the cake layer
n=empirical fit factor The pressure drop over a cake layer cannot be measured directly, but can be calculated from the measured resistance in accordance with Formula 1.

$$\Delta P_F = R_F J \eta \quad (7)$$

Equation (6) substituted in (7) with n=1 for most of the applications results in:

$$\Delta P_F = \omega\alpha(1 + \beta\Delta P_F)J\eta \quad (8)$$

With a compressible cake layer, the pressure drop over the cake layer is a function of the location in the cake layer. For a tubular filter medium discretization of (8) results in:

$$\frac{1}{\eta J} \cdot \frac{dP_F}{dr} = \alpha[1 + \beta P_F(r)] \quad (9)$$

The solution of this equation filled in at (6) results in:

$$R_F = \alpha\omega\phi(1\beta\alpha\omega\phi + J\eta) \quad (10)$$

wherein volume factor φ is provided by:

$$\varphi = \frac{r}{2\omega\chi} L_n\left(1 - \frac{2\omega\chi}{r}\right) \quad (11)$$

with
r=radius of the filter medium
χ=thickness of the cake layer

It should be noted that φ from Formula (11) approximates 1 for thin cake layer, flat membrane systems and low volume fractions.

Once the filtration curve is determined, the relation between the degree of fouling and the resistance is known. Thus this value can be used to calculate the amount of fouling after a cleaning treatment by measuring the resistance when filtering a clean fluid through a cleaned filter.

As described above, it is not possible to determine the characteristics of the cake layer from FIG. 1 or FIG. 2; FIG. 3 or FIG. 4 is also needed to be able to determine the compressibility β. When this β is known, the curve from FIG. 1 or FIG. 2 can be fitted to Formula (10); for this purpose various mathematical routines are known such as, for example, the Simplex method.

By regularly carrying out the characterization in accordance with the invention, the entire filtration process can be monitored for changes in the status characteristics, so that the changes in the characteristics of, for example, the fluid to be filtered, the nature of the filter cake and the condition of the filter can be followed. Based on this, the entire filtration process can be described, controlled, modeled and optimized. In addition, it provides information on how to adapt the characteristics of the fluid and on the capacity and quality of the filter itself.

The invention is not limited to the above specifically mentioned embodiments. The invention is limited by the appended claims only.

What is claimed is:

1. A method of filtering a fluid, the method comprising the steps of:
a) filtering a contaminated fluid to remove contaminants, which are deposited on a filter in the form of a filter cake;
b) subsequently feeding through the filter a substantially non-fouling fluid at:
I. a varying flux, and measuring the driving force; or
II. a varying driving force, and measuring the flux;
c) comparing using at least one standard set of data:
I. the measured values of the driving force with the respective flux; or
II. the measured value of the flux with the respective driving force; and
d) on the basis of the comparison in step c) characterizing a fouling status of the fluid to be filtered or of the filter; and wherein during successive periods of time the steps a) to d) are repeated, and the values obtained in step d) during successive periods of time are compared with each other in step d) in order to obtain a change in the status characteristic.

2. A method according to claim 1, wherein during step b) the substantially non-fouling, fluid is fed through the filter in the direction of filtration.

3. A method according to claim 1, wherein during step b) the, substantially non-fouling fluid is fed through the filter counter to the direction of filtration.

4. A method according to claim 1, wherein the standard set of step c) is obtained from a measurement of a substantially unfouled filter, said measurement involving a substantially non-fouling fluid.

5. A method according to claim 1, wherein the standard set comprises at least one set selected from: substantially constant flux values at varying driving force values; substantially constant driving force values at varying flux values; and increasing or decreasing driving force values at increasing or decreasing, respectively, flux values and wherein each of these sets represents a fouling characteristic.

6. A method according to claim 1, wherein the standard set is formed by a set of parameters of a model describing the relation between the driving force and the flux.

7. A method according to claim 1, wherein the characterization is selected from at least one of compressible filter cake and non-compressible filter cake.

8. A method according to claim 1, wherein during step b) the substantially non-fouling fluid does not substantially increase the degree of fouling of the filter any further.

9. A method according to claim 8, wherein the further increase of fouling of the filter during the characterization is maximally 10% of the fouling already present.

10. A method according to claim 9, wherein the further increase of fouling is expressed in the driving force, which is measured at a set flux.

11. A method according to claim 1, wherein after step d) has been carried out:
   e) the filter is subjected to a cleaning treatment in order to substantially remove the filter cake, whereafter
   f) step b) is repeated, and
   g) step c) is repeated in order to characterize the modified status.

12. A method according to claim 11, wherein the standard set of step g) is obtained from a measurement of a substantially unfouled filter, said measurement involving a substantially non-fouling fluid.

13. A method according to wherein claim 1, wherein the filtration step occurs in dead-end mode, in semi-dead end mode or in cross-flow mode.

14. A method according to claim 1, wherein during step b) also at least one other characteristic of the fluid is measured.

15. A method of controlling a filtration process on the basis of data obtained by a method according to claim 1.

16. A method according to claim 15, wherein a physical characteristic of the fluid is changed and/or that a treatment is carried out.

17. A method of obtaining a standard set of measuring data from a substantially unfouled filter, suitable to be used in a method according to claim 1, which comprises feeding substantially non-fouling fluid through a substantially unfouled filter at
   I. a varying flux, and measuring the driving force; or
   II. a varying driving force, and measuring the flux; and
   storing the values of the driving force and the respective flux in a standard set of data.

* * * * *